US012656843B2

(12) United States Patent
Wang

(10) Patent No.: US 12,656,843 B2
(45) Date of Patent: Jun. 16, 2026

(54) ON-CHIP DIGITALLY CONTROLLED ERROR RATE-LOCKED LOOP FOR ERROR RESILIENT EDGE ARTIFICIAL INTELLIGENCE

(71) Applicant: Intel Corporation, Santa Clara, CA (US)

(72) Inventor: Hechen Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 17/695,158

(22) Filed: Mar. 15, 2022

(65) Prior Publication Data

US 2023/0297149 A1     Sep. 21, 2023

(51) Int. Cl.
*G06F 1/26*     (2006.01)

(52) U.S. Cl.
CPC ..................................... *G06F 1/26* (2013.01)

(58) Field of Classification Search
CPC . G06F 1/26; G06F 1/28; G06F 1/3296; G06F 11/0721; G06F 11/076; G06F 11/0793; G06F 11/3024; G06F 11/3058; G06N 3/063
USPC .......................................................... 700/78
See application file for complete search history.

(56) References Cited

U.S. PATENT DOCUMENTS

2016/0350643 A1     12/2016     Hosokawa et al.
2019/0087715 A1     3/2019     Jeng 2019/0179685 A1 *     6/2019     Ki ........................ G06F 12/0246
2019/0213471 A1     7/2019     Jeon et al.
2019/0235940 A1 *     8/2019     Kegel ................. G06F 11/0793
2020/0218604 A1 *     7/2020     Lee ...................... G06F 11/1056
2021/0050932 A1 *     2/2021     Xuan ..................... H04L 1/0009
2021/0116955 A1     4/2021     Kim et al.
2021/0303982 A1     9/2021     Lee et al.
2023/0145487 A1 *     5/2023     Poulton .................. G05F 1/468
323/280

FOREIGN PATENT DOCUMENTS

KR     10-2019-0085785 A     7/2019
KR     10-2021-0045544 A     4/2021
KR     10-2021-0122354 A     10/2021

OTHER PUBLICATIONS

Bertino, E., et al., "Artificial Intelligence at the Edge: A Computing Community Consortium (CCC) Quadrennial Paper", Computing Community Consortium, 2020, 4 pages.
(Continued)

*Primary Examiner* — Chun Cao
(74) *Attorney, Agent, or Firm* — NICHOLSON DE VOS WEBSTER & ELLIOTT LLP

(57) ABSTRACT

Embodiments herein relate to a neural network processor in a control loop, where the control loop sets an optimum supply voltage for the processor based on a measured error count or rate of the neural network. For example, if the measured error count is greater than a target level or range, the supply voltage can be increased. If the measured error count is below the target level or range, the supply voltage can be decreased. The error rate can be measured by providing an error detection circuit for one or more monitored nodes/processing units of a neural network. The error detection circuit can receive the same input data as the associated monitored processing unit, but operates on only a portion of the input data.

14 Claims, 14 Drawing Sheets

(56) References Cited

OTHER PUBLICATIONS

Das, S., et al., "A Self-Tuning DVS Processor Using Delay-Error Detection and Correction", IEEE Journal of Solid-State Circuits, vol. 41, No. 4, Apr. 2006, pp. 792-804.

Das, S., et al., "RazorII: In Situ Error Detection and Correction for PVT and SER Tolerance", IEEE Journal of Solid-State Circuits, vol. 44, No. 1, Jan. 2009, pp. 32-48.

Eireiner, M., et al., "In-Situ Delay Characterization and Local Supply Voltage Adjustment for Compensation of Local Parametric Variations", IEEE Journal of Solid-State Circuits, vol. 42, No. 7, Jul. 2007, pp. 1583-1592.

Ernst, D., et al., "Razor. Circuit-Level Correction of Timing Errors for Low-Power Operation", IEEE Computer Society, 2004, pp. 10-20.

Ibrahim, Y., et al., "Soft Error Resilience of Deep Residual Networks for Object Recognition", IEEE Access, vol. 8, 2020, pp. 19490-19503.

International Search Report and Written Opinion, PCT App. No. PCT/US2023/013124, Jun. 5, 2023, 11 pages.

Lee, YH., et al., "A Near-Optimum Dynamic Voltage Scaling (DVS) in 65-nm Energy-Efficient Power Management With Frequency-Based Control (FBC) for SoC System", IEEE Journal of Solid-State Circuits, vol. 47, No. 11, Nov. 2012, pp. 2563-2575.

Peng, SY., et al., "Instruction-Cycle-Based Dynamic Voltage Scaling Power Management for Low-Power Digital Signal Processor With 53% Power Savings", IEEE Journal of Solid-State Circuits, vol. 48, No. 11, Nov. 2013, pp. 2649-2661.

Tchernev, E. B., et al., "Investigating the Fault Tolerance of Neural Networks", Neural Computation, vol. 17, 2005, 22 pages.

Torres-Huitzil, C., et al., "Fault and Error Tolerance in Neural Networks: A Review", IEEE Access, vol. 5, 2017, pp. 17322-17341.

Vyas, K., et al., "Edge AI: The Future of Artificial Intelligence and Edge Computing", IT Business Edge, Aug. 25, 2021, pp. 1-4.

* cited by examiner

Fig.

ON-CHIP DIGITALLY CONTROLLED ERROR RATE-LOCKED LOOP FOR ERROR RESILIENT EDGE ARTIFICIAL INTELLIGENCE

FIELD

The present application generally relates to the field of reducing power consumption by a processor and more particularly, to controlling a voltage supplied to a neural network processor.

BACKGROUND

Artificial intelligence (AI) applications have been found to be effective and popular in many domains in our daily life. As a data-heavy and compute-intensive technology, AI has been implemented in data centers. However, the need for real-time interactive applications such as immersive video conferencing, augmented/virtual reality, and autonomous vehicles, has increased. The current data-centric computing paradigm faces greater challenges. Thus, edge computing based AI or edge AI is attracting more attention, as it is well positioned to reduce data transfer to the central cloud and improve real-time decision-making while reducing latency. However, various challenges are presented in implementing edge AI applications.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 12B depicts a plot of error rate versus time, consistent with FIG. 12A, in accordance with various embodiments.

DETAILED DESCRIPTION

Figures 1, 2:
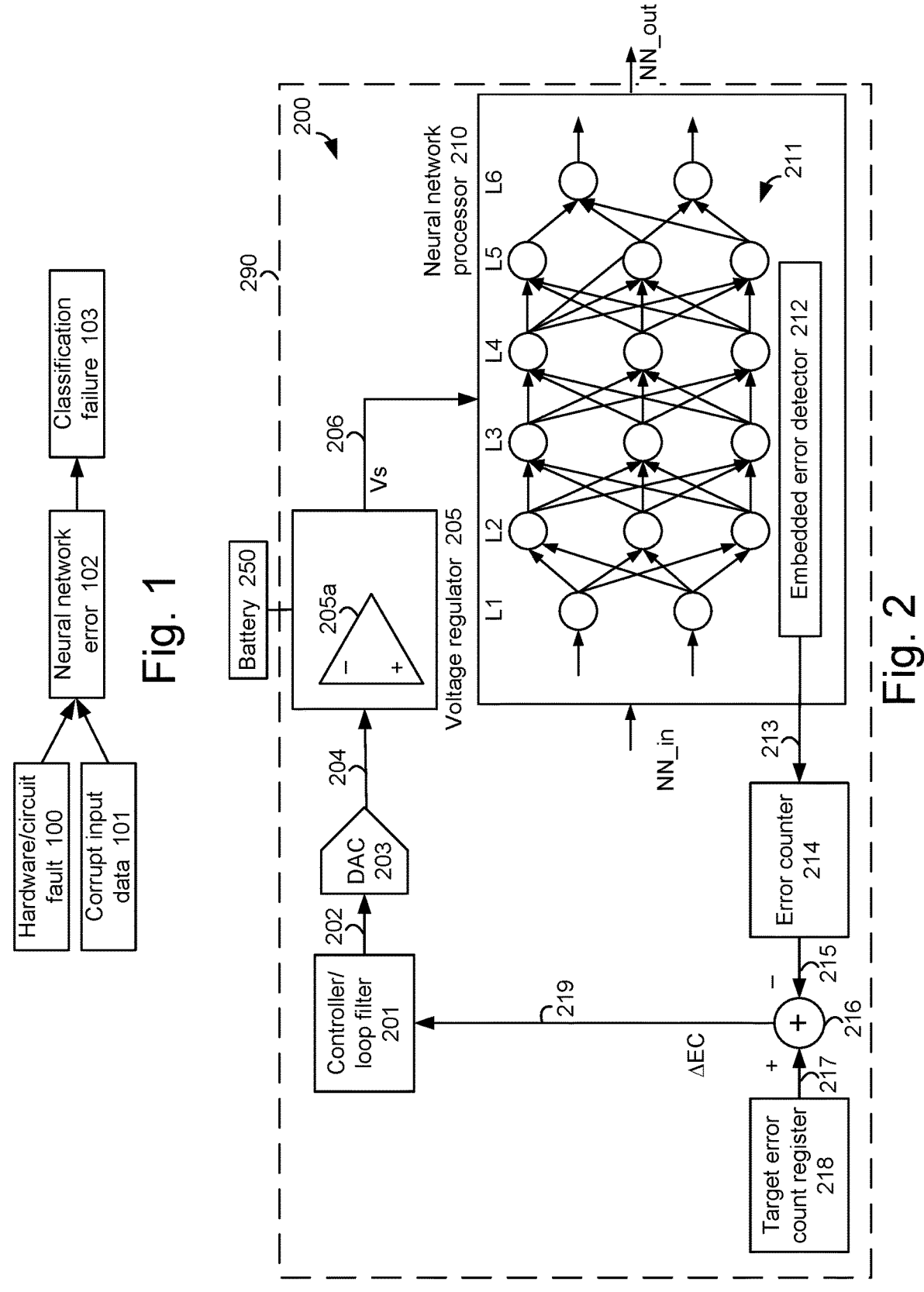
FIG. 1 depicts an example process flow using a neural network, showing a cause-effect relationship between fault, error and failure, in accordance with various embodiments.
FIG. 2 depicts an example circuit diagram of an error rate-locked loop for a neural network processor, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

As mentioned at the outset, various challenges are presented in implementing edge AI applications. Examples of edge devices include internet of things (IoT) devices/sensors, wireless sensors, mobile devices, smartphones and security cameras. AI devices can use neural networks to classify data. For example, a neural network may be used in a voice recognition process to recognize spoken commands. In another example, a neural network may be used in an image recognition process to recognize images.

One constraint involves power limitations, since most edge devices have a limited power source. Intensive operations can drain the battery or other power source quickly. To save power, one solution is to reduce the supply voltage of the device. Generally, the dynamic power consumption (P) of a circuit is given by: $P = (CV)^2 f$, where C is the loading capacitance of the circuit, V is the supply voltage, and f is the operating frequency. The power consumption is proportional to the square of the supply voltage.

However, with a lower supply voltage, hardware and circuits are more sensitive to noise and have a larger delay. This can cause errors during computations and lead to a failure in the classification of a neural network, for example. Although, AI, including neural networks, can tolerate some level of error or noise during computations since they mimic the human brain and are able to handle some faults during the processing. As a result, the power savings which results from lowering the supply voltage can be greater than the loss in accuracy. However, the error tolerance level is not universal for different network configurations. In addition, any error will influence the output to some degree since all components take part in the computational task.

One possible solution is to directly lower the supply voltage and accept the resulting increase in the error rate. Computational studies have shown that neural networks, especially deep neural networks such as ResNet, are robust to errors. They provide graceful degradation due to their resilience to inexact computations. The tolerance to approximation, for instance, can be leveraged for substantial performance and energy gains through the design of custom low-precision neural accelerators that operate on sensory input streams. A certain level of computation error will influence the output to some degree but will not let neural networks suffer a catastrophic failure. In addition, some of the precision reduced neural networks, e.g., a binary neural network, can tolerate a much larger error rate than other conventional networks. Adopting those kinds of networks are one option for edge AI applications.

Another possible solution focuses on correcting errors by either adding extra correction hardware or by evolving data coding, e.g., error-correction coding (ECC).

Another possible solution is to dynamically adjust the supply voltage by continuously monitoring the classification failure rate. Based on an observed failure rate, a control system can tune a voltage regulator for the workload.

However, when choosing to live with errors, there is a tradeoff between prioritizing efficiency, such that the classification accuracy cannot be guaranteed, and choosing performance, such that the power consumption is sacrificed. This is not optimal.

As for the use of ECC, this can detect and correct errors during data read and write in memory, but it cannot protect the data during computation. Hardware-based error correction, on the other hand, is too complicated and hard to implement since it requires basic computing element substitution.

The techniques disclosed herein address the above and other issues. In one aspect, an apparatus is provided which includes a neural network processor in a control loop, where the control loop sets an optimum supply voltage for the processor based on a measured error count or rate. For example, if the measured error count is greater than a target level or range, the supply voltage can be increased. This provides more power to the neural network so that it can operate properly, with fewer errors. If the measured error count is below the target level or range, the supply voltage can be decreased. This saves power.

Further, the supply voltage can be adjusted as a function of the difference between the measured error rate and the target level or range.

In one approach, the error rate is measured by providing an error detection circuit for one or more monitored nodes/processing units of a neural network. The error detection circuit can receive the same inputs as the associated monitored processing unit, but operates on only a portion of the input data. For example, a monitored processing unit and its error detection circuit may receive a common N-bit unit of data. The error detection circuit processes only M most significant bits of the data unit, where M<N. M and N are positive integers. N/M may be a power of 2, e.g., 2, 4 or 8. For example, N=32 bits and M=8 bits in one option.

The error detection circuit and the monitored processing unit can each include a multiple-and-accumulate (MAC) unit which operates on the input data to provide an output. The error detection circuit can include a comparison circuit which compares the output of the MAC of the error detection circuit to a portion of the output of the MAC of the monitored processing unit. If there is a mismatch, an error flag is set for that monitored processing unit.

A subset of all processing units in the neural network can be selected for monitoring. For example, the monitoring can occur for various processing units which are distributed throughout the network, in different layers of the network. The errors can be summed and output to an error counting unit over successive operating cycles of the neural network. After a specified number of cycles, the error count is compared to a target, e.g., a target level or range, as discussed to determine whether the supply voltage should be adjusted.

In one option, some processing units are weighted more heavily in the error count.

In one option, the neural network processor and its control loop can be fabricated on a single chip.

The techniques provide an error rate-locked loop (ERLL) as a solution to accurately track error rate and generate the exact required supply voltage without any design margin. The technique can provide substantial power savings. For example, for a neural network application that can tolerate an error rate of $1 \times 10^{-3}$, a power savings of 50% can be achieved compared to a default operation.

Furthermore, the ERLL is easy to adjust to the targeted error rate and can quickly jump among different target error rates. Thus, it has great adaptability for a variety of AI applications under different edge working scenarios and modes. For example, it can easily switch between a high performance mode with low error rate and high efficiency mode with a low supply voltage.

These and other features will be apparent in view of the following discussion.

FIG. 1 depicts an example process flow using a neural network, showing a cause-effect relationship between fault, error and failure, in accordance with various embodiments. A neural network error (box 102) can be caused by a hardware/circuit fault (box 100) and corrupt input data (box 101). The neural network error in turn can lead to a classification failure (box 103). For example, in a neural network which recognizes voice commands, a classification failure may result in a voice command being associated with the wrong action or not being recognized at all.

Adjusting the power supply based on the classification failure rate has three major problems. First, since the classification failure has two causes, computing fault and input corruption, the two cannot be distinguished by simply monitoring the classification failure rate. Second, to calculate the classification failure rate, data from a data center is required. The edge device cannot figure out on its own if it has failed, so that additional data transmission is required. Thus, as the device needs to wait for data and processed results from the data center, the delay in the voltage control loop is unbounded, which can easily cause instability and oscillation in the loop.

FIG. 2 depicts an example circuit diagram of an error rate-locked loop for a neural network processor, in accordance with various embodiments. The circuit 200 may be implemented on a chip 290, for example. The circuit includes a neural network processor 210 which implements a neural network 211, e.g., an artificial neural network. The neural network includes a number of processing units, also referred to as nodes or cells, arranged in multiple layers. Each processing unit is represented by a circle, and the arrows between circles represent input paths between the processing units. The layers include, from left to right, an input layer L1, four hidden layers L2-L5 and an output layer L6. See also FIG. 7 for further details. The initial data for the neural network, NN_in, is input at the input layer. The hidden layers are intermediate layers (between the input and output layers) where all the computations are performed. The output layer provides a result, NN_out, for the given inputs.

The processing units are connected by arrows which denotes input paths. In this example, each processing unit in L2-L5 receives three data inputs. Each input to a processing unit is a data unit of length N bits. N=32, for example. The number of processing units per layer can vary. Typically, the hidden layers have the same number of processing units. The neural network communicates with an embedded error detector 212. The embedded error detector can include error detection circuits which are associated with selected monitored processing units of the neural network. Each error detection circuit determines whether an error has occurred at the associated monitored processing unit and provides a corresponding error flag.

The embedded error detector is coupled via a path 213 to an error counter 214, which counts the number of errors which are detected in the neural network over a period of time. This period of time can include hundred or thousands of operating cycles of the neural network, for example. At specified times, the error counter provides an error count on a path 215 to an adder 216. A target error count is also provided to the adder via a path 217 by a target error count register 218. The difference between these two counts, ΔEC, is provided on a path 219 to a controller/loop filter 201. The controller/loop filter provides a digital output on a path 202 to a digital-to-analog converter (DAC) 203 based on AEC. The DAC in turn provides an analog output on a path 204 to a voltage regulator 205. The voltage regulator includes an amplifier 205a to adjust a voltage supply, Vs, to the neural network processor on a path 206. The voltage regulator receives power from an off-chip battery 250 or other power source such as an energy harvester chip.

The control loop formed by the circuit 200 can be an on-chip Error Rate-Locked Loop (ERLL) for edge neural network accelerators. The ERLL can constantly track the computation errors in the neural network and adjust the supply voltage accordingly to reach an optimum operation point automatically. It provides an on-chip solution that enables edge AI hardware to achieve the highest power efficiency and acceptable accuracy, simultaneously. The ERLL includes a negative feedback with a carefully designed loop filter to stabilize the voltage supply of the error resilient edge AI workload and lock the error rate to a desired level. An embedded computing error sensing technique is developed to specifically identify the error due to computation.

The circuit is also robust to variations in process, voltage and temperature (PVT). With the help of the ERLL, the NN accelerator workload can always operate at its optimum operation condition and reach the balanced point between classification accuracy and power efficiency. Moreover, the targeted error rate is adjustable to fit the requirements of different applications and working scenarios. The embedded computing error sensing technique also reduces the need for accuracy rate monitoring at the edge node.

The ERLL can be provided as a standalone physical block placed between the power source (battery, capacitor, energy harvester, etc.) and the power grid of the AI workload.

Figure 3:
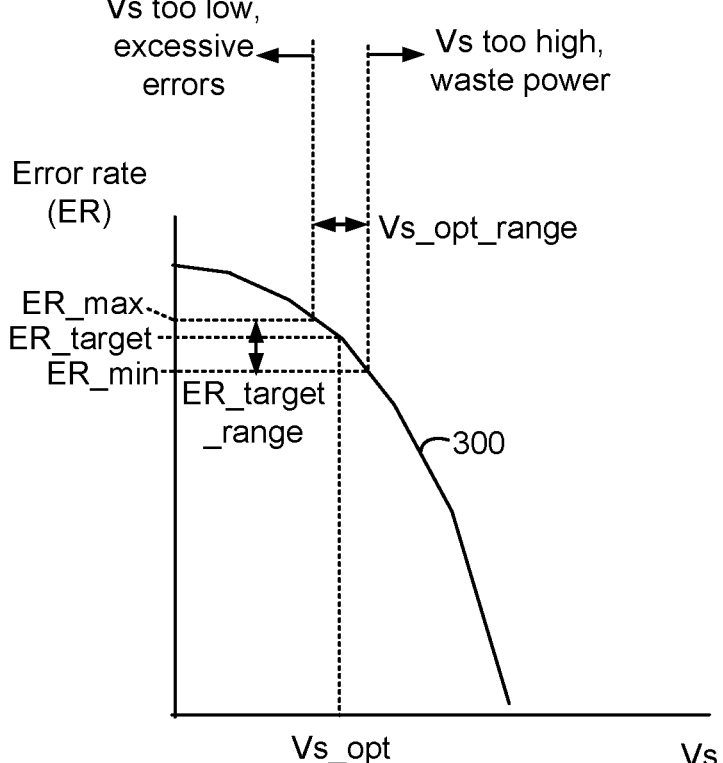
FIG. 3 depicts an example plot of error rate verses supply voltage for the circuit of FIG. 2, in accordance with various embodiments.

FIG. 3 depicts an example plot of error rate verses supply voltage for the circuit of FIG. 2, in accordance with various embodiments. The vertical axis depicts an error rate (ER) on a logarithmic scale while the horizontal axis depicts supply voltage, Vs, on a linear scale. The error rate generally increases as Vs decreases. The optimum error rate for a neural network can be specified as a target, e.g., a target level, ER_target, or a target range, ER_target_range. The plot 300 defines an optimum supply voltage, Vs_opt, which corresponds to ER_target, and an optimum range of supply voltages, Vs_opt_range which corresponds to ER_target_range. In one approach, Vs is not adjusted if the error rate falls within the range ER_target_range. If Vs is too high, e.g., above Vs_opt_range, power is wasted in the circuit. If Vs is too low, e.g., below Vs_opt_range, excessive errors are present in the neural network.

Note that the vertical axis could equivalently represent a number of errors, or error count, in a specified time period.

As mentioned, power is proportional to the square of the supply voltage. Computation error is also related to the supply voltage. Errors may occur during computation if there is not a sufficient supply voltage margin reserved for the hardware. But, the connection between the supply voltage and the error rate cannot be described by a simple equation. The relationship between them, as depicted by the plot 300, was obtained by circuit level simulations. The simulation result is based on a 16-bit multiply-and-accumulate operation, which has the highest utilization rate in most of the AI and deep neural network (DNN) hardware implementations. In this example, an error rate of $1 \times 10^{-3}$ (ER_target) can be achieved with a supply power, Vs_opt, of about 0.55 V, while the default supply voltage for digital operations is 0.8 V. This value of ER_target is tolerable in many DNNs. As a result, by reducing the DNN hardware supply voltage from 0.8 V to 0.55 V, a power savings of 50% can be achieved with no significant accuracy degradation.

One challenge is that the slope of the plot 300 around the optimum point is steep, which means the supply voltage should be very stable in order to keep Vs within the optimum range. Furthermore, the optimum point is not fixed and can change due to PVT variations. The techniques disclosed herein provide a fine tuning control mechanism which addresses the above challenges.

Figure 4:
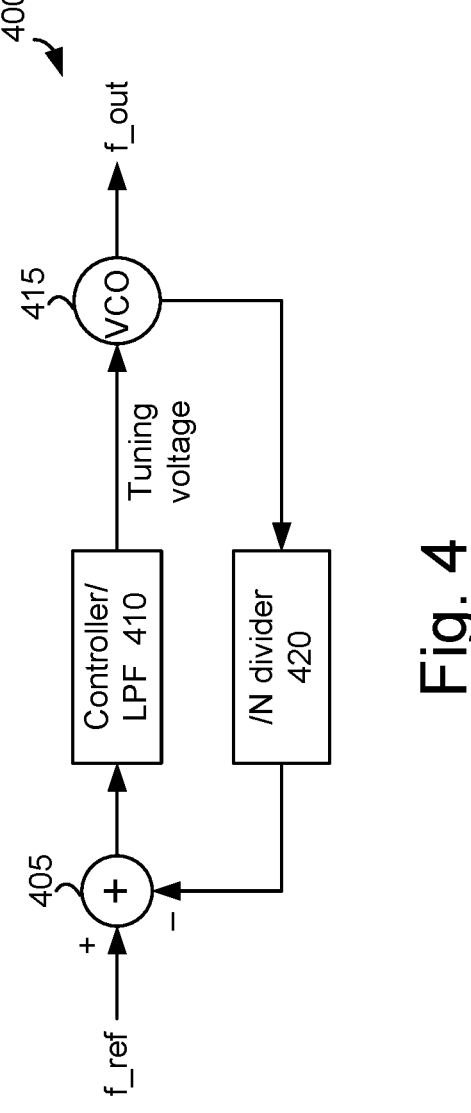
FIG. 4 depicts an example circuit diagram of a phase-locked loop, in accordance with various embodiments.

FIG. 4 depicts an example circuit diagram of a phase-locked loop (PLL), in accordance with various embodiments. The PLL 400 includes a phase comparator 405 which receives a reference frequency signal, f_ref and a feedback signal from a/N divider 420. The phase comparator provides an output which represents a phase difference between the two signals for use by a controller/low pass filter (LPF) 410 to provide a tuning voltage to a voltage-controlled oscillator (VCO) 415. The VCO in turn outputs a signal having a frequency, f_out. The output frequency is provided to the/N divider in a feedback path.

An ERLL as described herein is proposed to automatically find the optimum operation point under different PVT situations and stabilize the error rate. The ERLL can be understood in the context of the PLL. The phase detector of the PLL compares the reference signal with the oscillator frequency and outputs an error signal. A loop filter (usually a low-pass filter) then generates an error voltage from the error signal. The VCO then increases or decreases the oscillator frequency to lock to the input frequency. This produces an output frequency that is equal to the input frequency, and a constant phase shift (which could be zero) between the two signals. A PLL typically also has a frequency divider in its feedback loop in order to create an output that is a multiple of the reference frequency instead of one that is exactly equal to it. By adopting this negative feedback loop, the PLL can lock to a desired frequency even with PVT variations.

Figure 5:
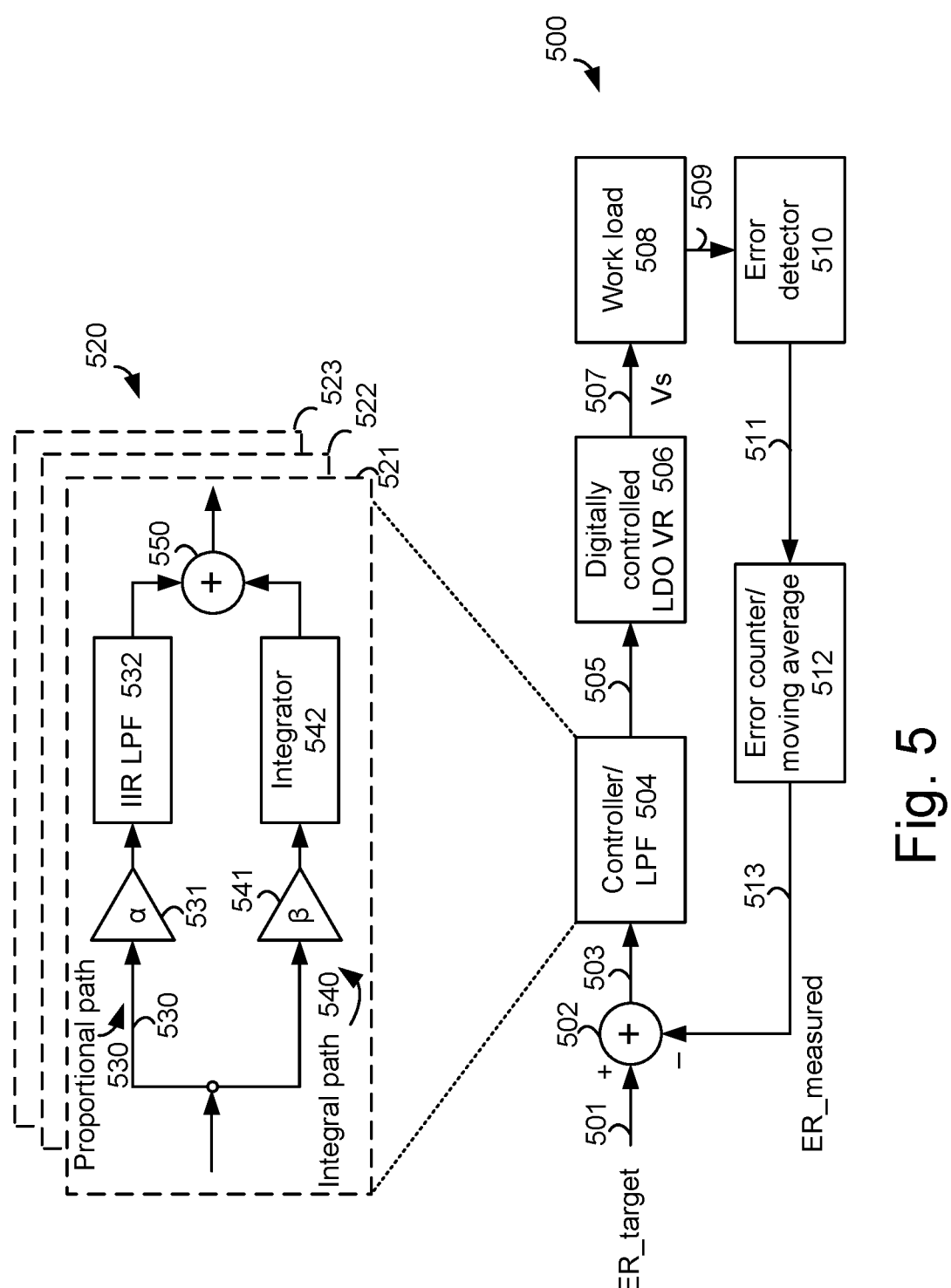
FIG. 5 depicts an example circuit diagram of an error rate-locked loop consistent with FIG. 2, in accordance with various embodiments.

FIG. 5 depicts an example circuit diagram of an ERLL consistent with FIG. 2, in accordance with various embodiments. The ERLL 500 includes an adder 502 that determines a difference between an error rate target, ER_target, on a path 501, and a measured error rate, ER measured, on a path 513. Note that ER could equivalently represent an error count in a specified time period. The difference is provided on a path 503 to a controller/LPF 504. The controller/LPF in turn provides a digital output via a path 505 to a digitally-controlled low dropout (LDO) voltage regulator (VR) 506, which in turn provides a supply voltage Vs via a path 507 to a work load 508. An example of a workload is one or more neural networks. The work load provides data on a path 509 to an error detector 510, which in turn provides an indication of a number of errors in successive processing cycles of the work load on a path 511. An error counter/moving average function 512 receives the input and counts up the errors over a period of time such as over a specified number of processing cycles. This could be, e.g., hundreds or thousands of processing cycles of the workload. The error count from the error counter can be a moving average over multiple operating cycles of the neural network processor. In one approach, a processing cycle is a clock cycle for the workload. See also FIG. 10A-12B regarding different counter sizes. The error counter/moving average function has a limited range, which can be set to be, e.g., ten times larger than the reciprocal of the targeted error rate. For example, if the target error rate is $1 \times 10^{-3}$, ten times the reciprocal is $1 \times 10^{4}$.

The controller/LPF 504 can include a set of controllers 520. The set of controllers includes example controllers 521, 522 and 523, each of which is optimized for a different range of error rates/counts. For example, the controllers 521, 522 and 523 may be optimized for error rate ranges of $1 \times 10^{-1}$ to $1 \times 10^{-2}$, $1 \times 10^{-3}$ to $1 \times 10^{-4}$, and $1 \times 10^{-5}$ to $1 \times 10^{-6}$, respectively. Each controller includes a proportional path 530 and an integral path 540. The proportional path includes an amplifier 531 followed by an infinite impulse response (IIR) low pass filter (LPF) 532. The integral path includes an amplifier 541 followed by an integrator 542. Each controller can be preloaded with different gain parameters $\alpha$ and $\beta$ in the amplifiers 531 and 541, respectively, according to the associated error rate range. That is, optimal gain parameters are selected for each error range. For example, a first set of $\alpha$ and $\beta$ can be provided in the controller 521 for the error rate range of $1 \times 10^{-1}$ to $1 \times 10^{-2}$, a second set of $\alpha$ and $\beta$ can be provided in the controller 522 for the error rate range of $1 \times 10^{-3}$ to $1 \times 10^{-4}$, and so forth. The outputs of the two paths are combined at an adder 550 to provide an output to the digitally-controlled LDO VR 506.

Although the ERLL is analogous to the PLL, the ERLL provides additional technical challenges. A first challenge is the loop delay and error source. There are multiple options to sense the error. One option, as mentioned, is to use a classification failure rate. However, this is problematic since the edge device cannot figure out on its own if it has a classification failure. Instead, to calculate the classification failure rate, additional data and processing capability from a data center is required. As it needs to wait for data and processed results from the data center, the delay in the voltage control loop is unbounded. This large and sometimes unpredicted delay can easily cause instability and oscillation in a feedback control loop. In addition, as mentioned, there is no way to distinguish between a computing fault and corrupt input data by simply monitoring the classification failure rate. If the error is due to corrupt input data, the control loop will collapse.

A second challenge is a large division ratio. In an example implementation of the PLL of FIG. 4, f_ref may be 24 MHz, the tuning voltage may be 2.4 MHz and f_out may be 2.4 GHz. The ratio of f_out/f_ref is therefore 1,000. This is the common ratio between input and output frequency of the PLL.

However, for the ERLL, in order to lock to a target error rate of $1 \times 10^{-4}$, for example, the division ratio needs to be set to at least 100,000. In this case, for every one cycle on the path 509, there are 10,000 cycles on the path 513 and 100,000 cycles on the path 505. If a smaller error rate is required, the ratio will be even larger. However, a very large division ratio will lead to a higher loop gain and affect the stable margin of the loop. As a result, the controller (loop filter) needs to be carefully designed to ensure stability and locking performance.

To deal with the first challenge locally at the edge device, an embedded error sensing technique can be implemented that only detects error from computing faults. This approach is appropriate since a propagation delay increase is the major cause of the computing faults when there is an insufficient supply voltage and the delay accumulates along the critical path. As a result, longer bit-length operators have larger delays and will also have more errors when the supply voltage decreases, as explained further in connection with FIG. 6.

Figure 6:
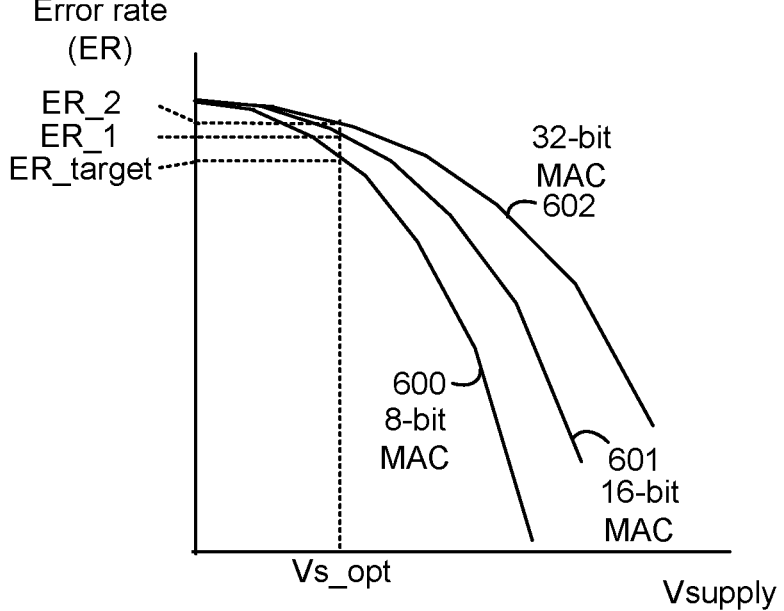
FIG. 6 depicts an example plot of error rate verses supply voltage for different bit lengths of a multiply and accumulate (MAC) operator in the neural network processor of FIG. 2, in accordance with various embodiments.

FIG. 6 depicts an example plot of error rate verses supply voltage for different bit lengths of a multiply and accumulate operator in the neural network processor of FIG. 2, in accordance with various embodiments. Similar to FIG. 3, the vertical axis depicts an error rate (ER) on a logarithmic scale while the horizontal axis depicts supply voltage, Vs, on a linear scale. The error rate generally increases as Vs decreases. Plots 600, 601 and 602 depict the case of a neural network having processing units with 8-bit, 16-bit and 32-bit multiply and accumulate (MAC) units, respectively. The MAC units may operate at 850 MHz, for example.

As can be seen, the error rate is significantly lower when the bit length of the MAC unit is shorter. The error performance of an 8-bit MAC unit can be several orders of magnitude better than that of a 16-bit MAC unit. For example, with an 8-bit MAC (plot 600), an optimum supply voltage, Vs_opt, results in a target error, ER_target. However, a 16-bit MAC (plot 601) results in a higher error rate, ER_1, and a 32-bit MAC (plot 602) results in an even-higher error rate, ER_2. An embedded detection circuit (EDC) for the neural network relies on this fact to detect an error in a MAC unit of the network. The output of a shorter-bit MAC unit from the EDC is assumed to be error-free and compared to a portion of the output of a longer-bit MAC on the neural network, as discussed next.

Figure 7:
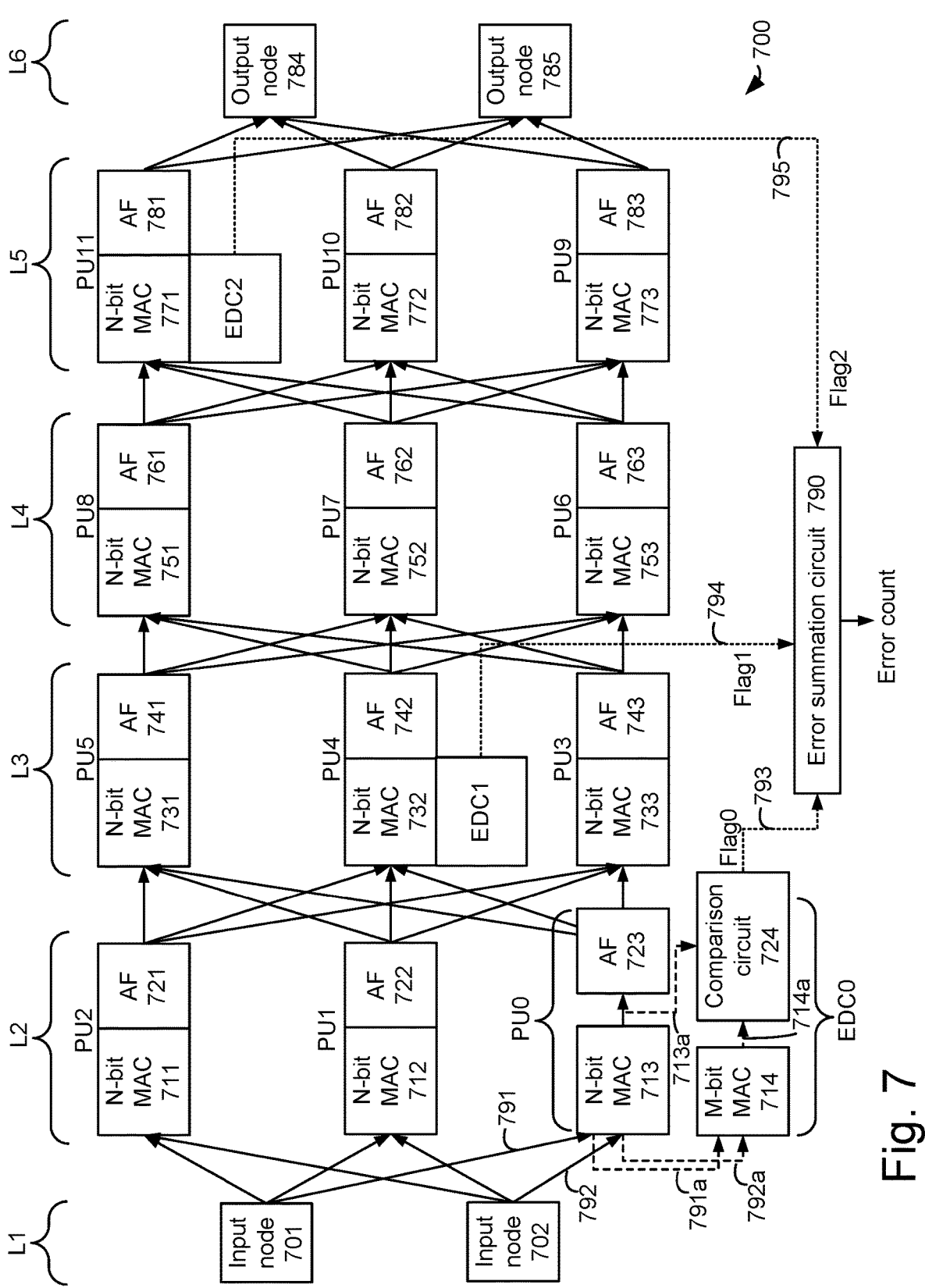
FIG. 7 depicts an example implementation of the neural network processor of FIG. 2, including embedded computing error detection components, in accordance with various embodiments.

FIG. 7 depicts an example implementation of the neural network processor of FIG. 2, including embedded computing error detection components, in accordance with various embodiments. The neural network processor 700 includes a number of processing units or nodes arranged in layers L1-L6, consistent with the neural network 211 of FIG. 2. For example, an input layer L1 includes input nodes 701 and 702. L2-L5 are intermediate or hidden layers. L2 includes processing units PU0-PU2, L3 includes processing units PU3-PU5, L4 includes processing units PU6-PU8, and L5 includes processing units PU9-PU11. An output layer L6 includes output nodes 784 and 785. Each processing unit includes an N-bit MAC and an activation function (AF). For example, PU0 includes a MAC 713 and an AF 723. PU1 includes a MAC 712 and an AF 722. PU2 includes a MAC 711 and an AF 721. PU3 includes a MAC 733 and an AF 743. PU4 includes a MAC 732 and an AF 742. PU5 includes a MAC 731 and an AF 741. PU6 includes a MAC 753 and an AF 763. PU7 includes a MAC 752 and an AF 762. PU8 includes a MAC 751 and an AF 761. PU9 includes a MAC 773 and an AF 783. PU10 includes a MAC 772 and an AF 782. PU11 includes a MAC 771 and an AF 781.

Each MAC receives one or more data inputs on respective input paths. For example, PU0 can receive data on input paths 791 and 792. Moreover, each path may be associated with a weight. The MAC unit 713 multiplies each input by its respective weight and accumulates the results from these multiplications. For example, an N-bit unit of data can be received on each input path. The MAC unit 713 then provides an output to the AF 743. Generally, the activation function defines how the weighted sum of the inputs is transformed into an output from the current processing unit for use by a next processing unit in the neural network. The AF is also referred to as a transfer function. A variety of AFs can be used, including an identity function (f(x)=x), a binary step, a sigmoid function curve or S-shaped function (f(x) $=1/(1+e^{-x})$), a hyperbolic tangent function (f(x)=tanh(x)), an arc tangent function (f(x)=arctan (x)), a ReLU (Rectified Linear Unit) function (f(x)=max(0,x)), a parametric rectified linear unit, and an exponential linear unit.

Additionally, a subset of the processing units, e.g., PU0, PU4 and PU11, are selected as monitored processing units while the remaining processing units are unmonitored processing units. A respective error detection circuit (EDC) is associated with each monitored processing unit. For example, EDC0, EDC1 and EDC2 are associated with PU0, PU4 and PU11, respectively. Each EDC receives the same input data as the associated monitored PU. However, the EDC processes only a strict subset of the data, e.g., less than all of the data. The EDC EDC0 includes an M-bit MAC 714 instead of the N-bit MAC 713 of the associated monitored PU, PU0, where M<N. The N-bit MAC 713 and the M-bit MAC 714 may receive the N-bit data units or words, but the M-bit MAC 714 only processes the M most significant bits (MSBs) of the N-bit data units. The M-bit MAC 714 may discard the remaining N-M bits of the N-bit data units. For example, the MACs 713 and 714 may receive a first N-bit data unit on the input paths 791 and 791a, respectively, and a second N-bit data unit on the input paths 792 and 792a, respectively. See also FIG. 8-10.

Thus, the proposed computing error sensing technique involves a reduced bit-length computing hardware replica of the MACs of the processing units. The EDCs can be discretely embedded and distributed in the neural network to capture error information. For instance, in an N=32-bit neural network system, one or more of the 32-bit MAC units in the network can be selected for the error sensing. An M=8-bit MAC, for example, is then placed at a side of the 32-bit MAC. The 8-bit MAC only takes the first 8 most significant bits (MSBs) from the 32-bit MAC's inputs. Similarly, its output will be compared with the first 8 MSBs from the 32-bit MAC's output, in one possible implementation. If the they match, there is no error during computation. If there is a mismatch between the output of the MAC 714 and the first 8 bits of the output of the MAC 713, an error flag is set to declare an error. The comparison circuit 724 receives the output from the MACs 713 and 714 on paths 713a and 714a, respectively, and sets a value for a flag, Flag0, on an output path 793. The output path 793 in turn is coupled to an error summation circuit which sums the errors from the EDCs in the network. For example, Flag1 is output from EDC1 via a path 794 based on whether an error has been detected at the MAC 732, and Flag2 is output from EDC2 via a path 795 based on whether an error has been detected at the MAC 771.

The error summation circuit 790 outputs an error count to the error counter 214 of FIG. 2. In one approach, errors are summed up and periodically reported to the error counter.

As mentioned, advantageously, this approach can only count the errors caused by computing circuit faults without relying on higher level information such as classification failures. Accordingly, no additional data transfer latency is introduced into the feedback loop and the process is not misguided by input data corruption.

Additionally, by monitoring only a subset of the processing units, an error count can be obtained which is representative of the error rate in the overall network while avoiding the complexity of monitoring all processing units. The subset can be, e.g., less than 1, 3, 5, 10 or 20% of all processing units in the neural network, for example.

Figure 8:
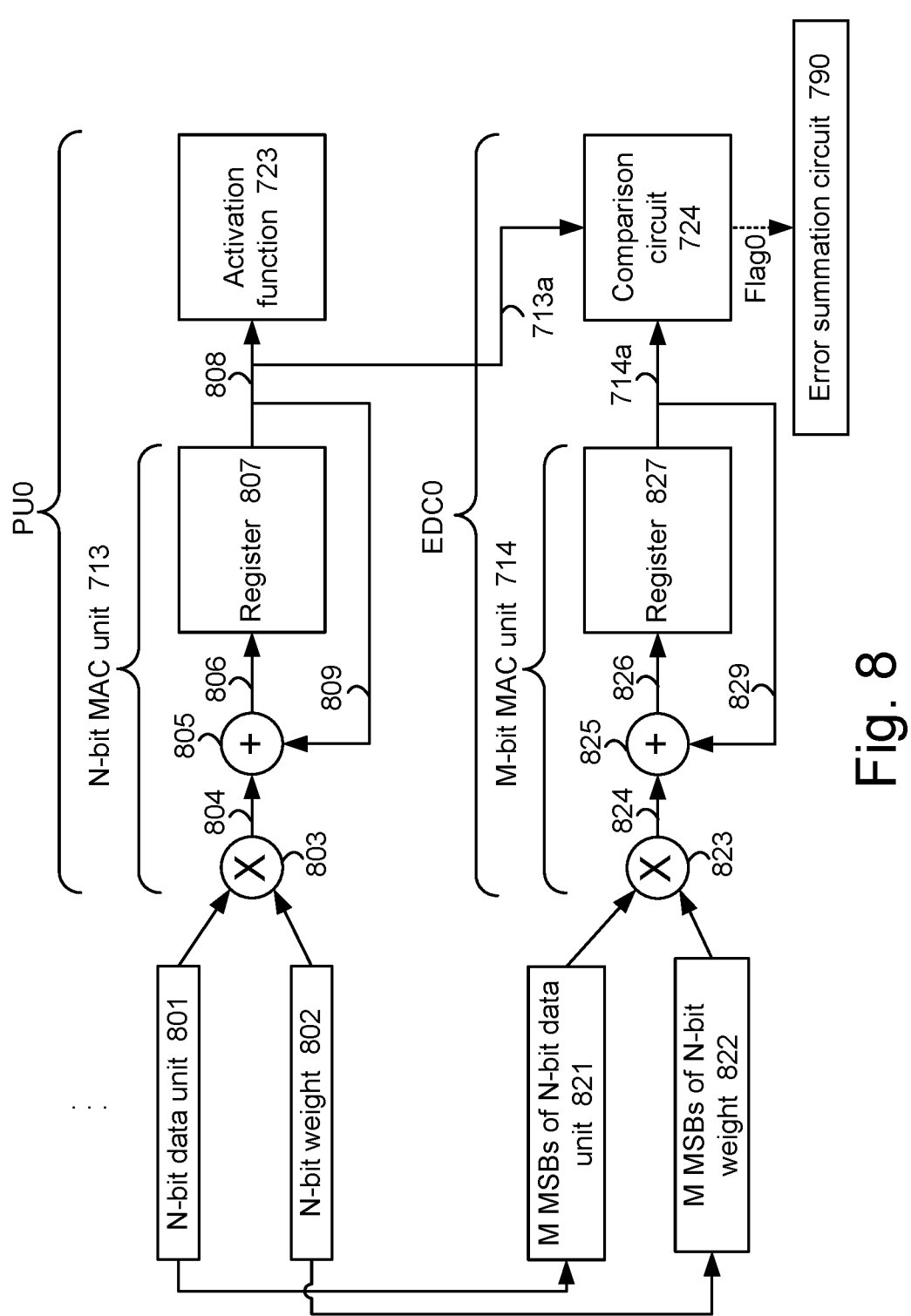
FIG. 8 depicts an example implementation of the monitored processing unit PU0 and error detection circuit EDC0 of FIG. 7, in accordance with various embodiments.

FIG. 8 depicts an example implementation of the monitored processing unit PU0 and error detection circuit EDC0 of FIG. 7, in accordance with various embodiments. In the N-bit MAC unit 713, an N-bit data unit 801 is multiplied by an N-bit weight 802 at a multiplier 803. The multiplication product from the multiplier is provided via a path 804 to an adder 805, which adds the multiplication product to a value on a feedback path 809, to provide a sum on a path 806. A register 807 totals the multiplication products for each of the input paths of the MAC unit. Once the multiplication products from all of the input paths have been added together, a corresponding output is provided on a path 808 to the activation function. The activation function in turn provides a corresponding output to one or more subsequent processing units in the neural network, e.g., PU3-PU5. The output on the path 808 is also provided to the comparison circuit 724 via the path 713a.

In the EDC0, M MSBs 821 of the N-bit data unit 801 are multiplied by M MSBs 822 of the N-bit weight 802 at a multiplier 823. The multiplication product from the multiplier is provided via a path 824 to an adder 825, which adds the multiplication product to a value on a feedback path 829, to provide a sum on a path 826. A register 827 totals the multiplication products for each of the input paths of the MAC unit. Once the multiplication products from all of the input paths have been added together, a corresponding output is provided on the path 714a to the comparison circuit 724.

In this example, the comparison circuit compares M MSBs of the N-bit output from the MAC 713 to an M-bit output from the MAC 714. The comparison circuit can include logic functions such as AND gates to perform the comparison. In one approach, the output of the comparison circuit is one bit having a first value, e.g., 0, if there is an exact match between the compared bits and a second value, e.g., 1, if there is not an exact match between the compared bits. In another approach, the output of the comparison circuit indicates how many bits do not match.

In one option, some processing units are weighted more heavily in the error count. That is, the respective error data of the respective error detection circuits is weighted differently for different respective error detection circuits. The different weights may be based on an insight that errors from certain processing units are more relevant than errors in other processing units.

Figure 9A:
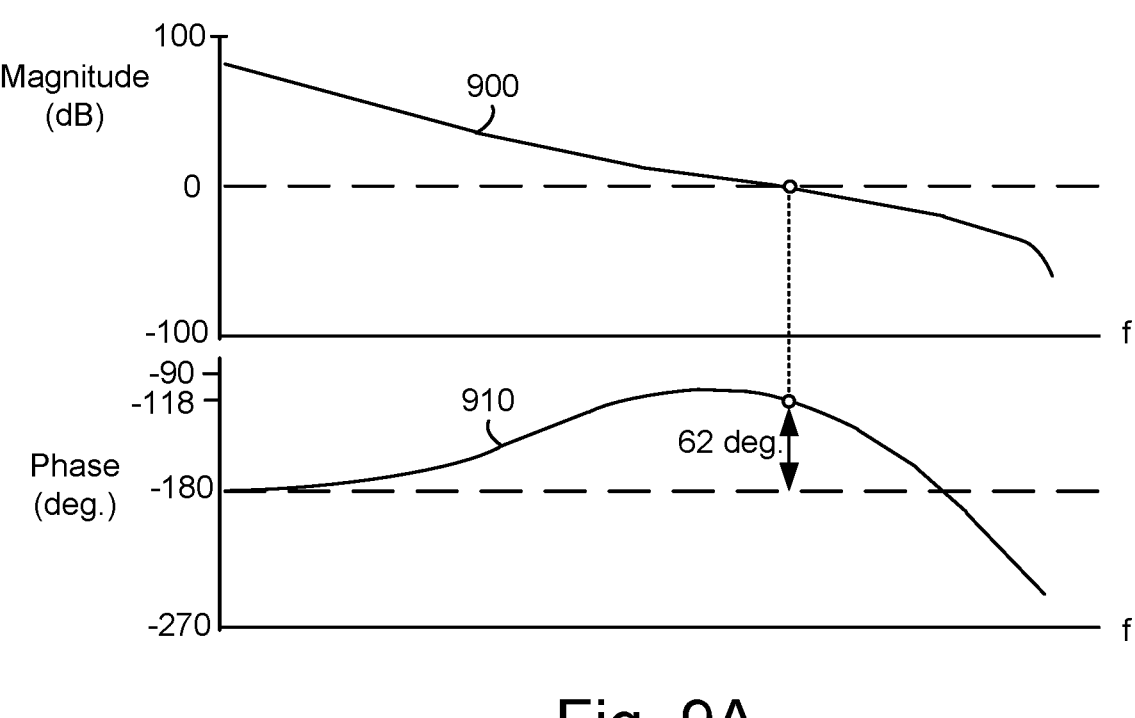
FIG. 9A depicts a plot of magnitude (plot 900) and phase (plot 910) versus frequency (f) for the controller 201 or 504, where the phase margin is greater than 45 degrees, indicating the control loop is stable, in accordance with various embodiments.

FIG. 9A depicts a plot of magnitude (plot 900) and phase (plot 910) versus frequency (f) for the controller 201 or 504, where the phase margin is greater than 45 degrees, indicating the control loop is stable, in accordance with various embodiments. This is a Bode diagram in which the magnitude is in decibels and the phase is in degrees.

As mentioned above, the second challenge of the ERLL is the large division ratio, which can cause an oscillation in the error rate. To stabilize the control loop, a proportional-integral (PI) controller 201 or 504 is used. By adjusting the gain parameters $\alpha$ and $\beta$ of the proportional and integral paths, respectively, as well as the cut-off frequency of the IIR filter, a sufficient amount of phase margin can be obtained in an open-loop analysis. As shown, a 62 degree phase margin is designed for an error rate of $1 \times 10^{-3}$, while the unconditional stable requirement is to have a phase margin greater than 45 degrees. The phase margin is obtained by identifying the frequency at which the magnitude of plot 900 crosses zero. This point, represented by the vertical dashed line, is followed down to the plot 910. The corresponding phase is –118 degrees, so that the phase margin is –118–(–180)–62 degrees.

Figure 9B:
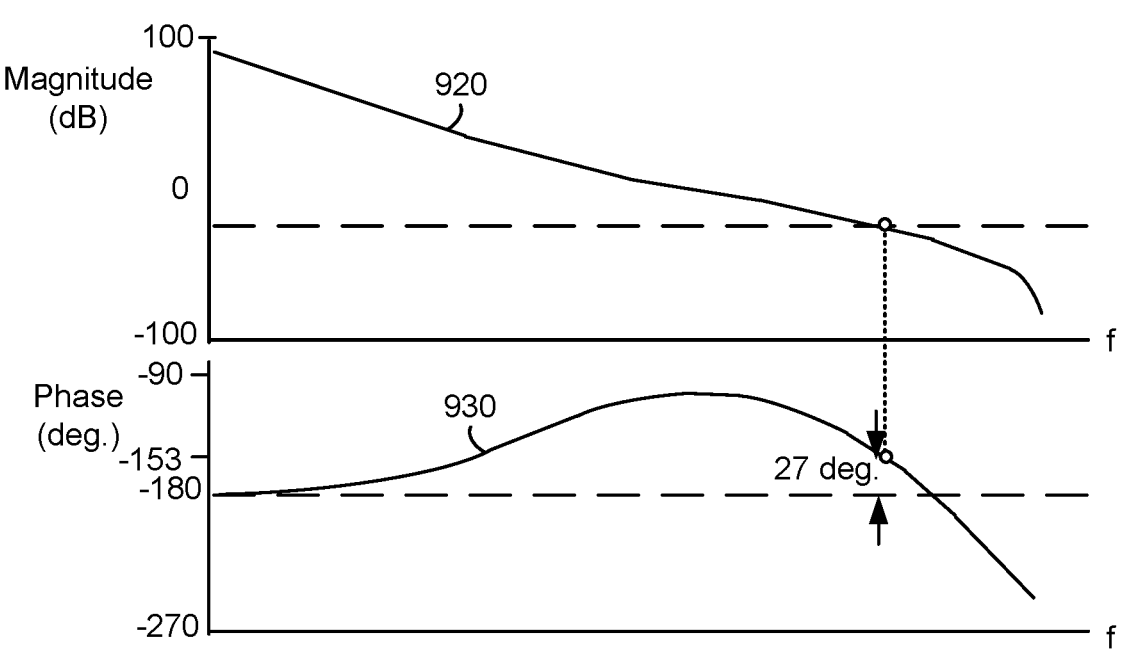
FIG. 9B depicts a plot of magnitude (plot 920) and phase (plot 930) versus frequency (f) for the controller 201 or 504, where the phase margin is less than 45 degrees, indicating the control loop is unstable, in accordance with various embodiments.

FIG. 9B depicts a plot of magnitude (plot 920) and phase (plot 930) versus frequency (f) for the controller 201 or 504, where the phase margin is less than 45 degrees, indicating the control loop is unstable, in accordance with various embodiments. If the targeted error rate is charged to $1 \times 10^{-4}$, for example, without adjusting any controller parameters, the phase margin suddenly decreases to only 27 degree, which is very dangerous in a negative feedback loop. The loop may start to oscillate with some PVT perturbations. The phase margin is obtained by identifying the frequency at which the magnitude of plot 920 crosses zero. This point, represented by the vertical dashed line, is followed down to the plot 920. The corresponding phase is –153 degrees, so that the phase margin is –153–(–180)–27 degrees.

Figures 10A, 10B, 11A, 11B, 12A:
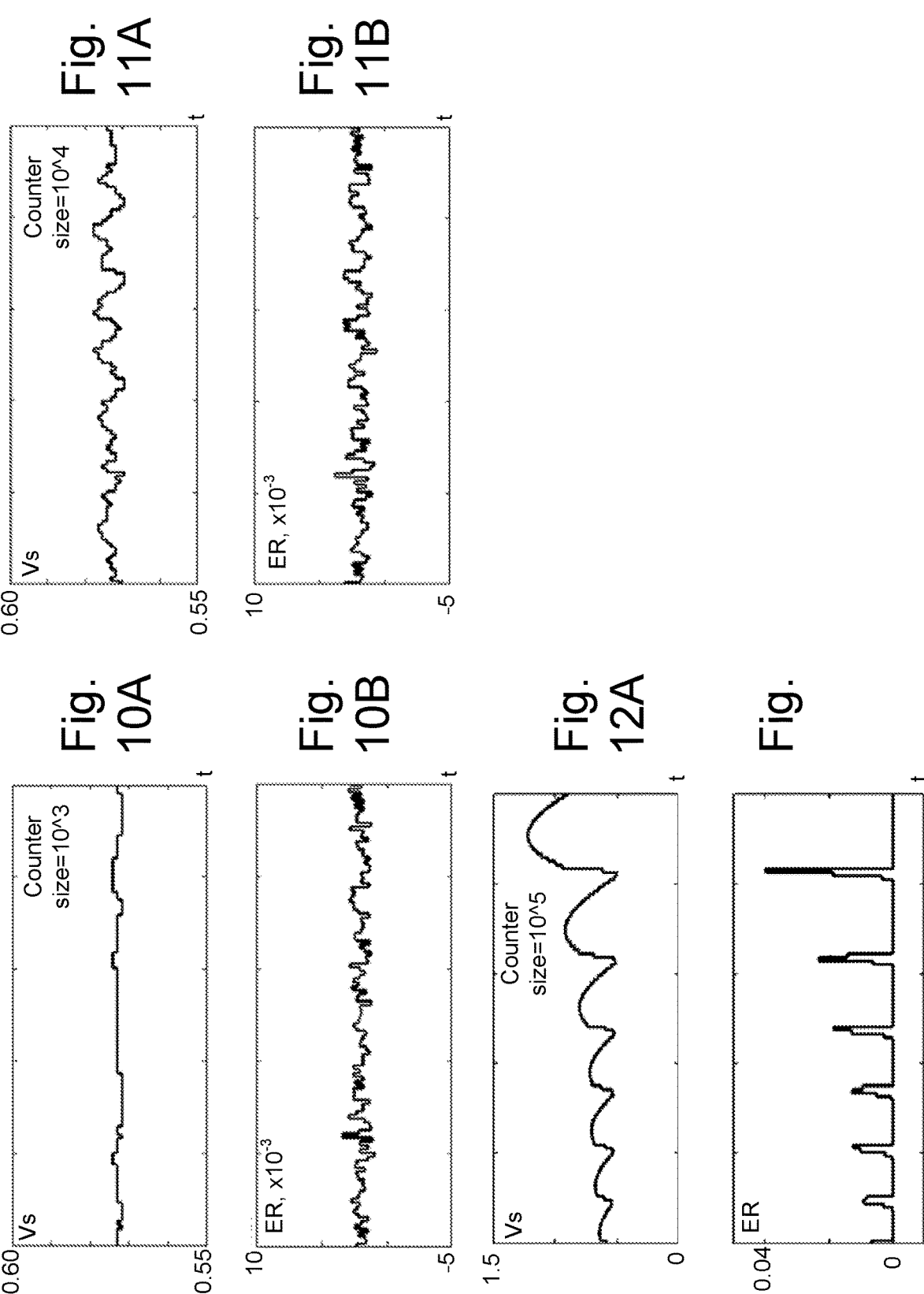
FIG. 10A depicts a plot of supply voltage versus time for the neural network processor 210 of FIG. 2, with a counter size of 10^3 at the error counter 214 or 512, in accordance with various embodiments.
FIG. 10B depicts a plot of error rate x 10^-3 versus time, consistent with FIG. 10A, in accordance with various embodiments.
FIG. 11A depicts a plot of supply voltage versus time for the neural network processor 210 of FIG. 2, with a counter size of 10^4 at the error counter 214 or 512, in accordance with various embodiments.
FIG. 11B depicts a plot of error rate x 10^-3 versus time, consistent with FIG. 11A, in accordance with various embodiments.
FIG. 12A depicts a plot of supply voltage versus time for the neural network processor 210 of FIG. 2, with a counter size of 10^5 at the error counter 214 or 512, in accordance with various embodiments.

FIG. 10A depicts a plot of supply voltage versus time for the neural network processor 210 of FIG. 2, with a counter size of $10^3$ at the error counter 214 or 512, in accordance with various embodiments. The time axis is the same in FIG. 10A-12B. In these examples, variations in the supply voltage and error rate (ER) are depicted for different targeted error rates. The controller has the same parameters in each example.

FIG. 10B depicts a plot of error rate x $10^{-3}$ versus time, consistent with FIG. 10A, in accordance with various embodiments. In FIGS. 10A and 10B, the error rate is $1 \times 10^{-3}$, and the control loop is steady.

FIG. 11A depicts a plot of supply voltage versus time for the neural network processor 210 of FIG. 2, with a counter size of $10^4$ at the error counter 214 or 512, in accordance with various embodiments.

FIG. 11B depicts a plot of error rate x 10^−3 versus time, consistent with FIG. 11A, in accordance with various embodiments. In FIGS. 11A and 11B, the error rate is 1×10^−4, and small ripples can be observed in Vs.

FIG. 12A depicts a plot of supply voltage versus time for the neural network processor 210 of FIG. 2, with a counter size of 10^5 at the error counter 214 or 512, in accordance with various embodiments.

FIG. 12B depicts a plot of error rate versus time, consistent with FIG. 12A, in accordance with various embodiments. In FIGS. 12A and 12B, the error rate is 1×10^−5, and the loop starts to oscillate, resulting in large changes in Vs and ER.

To ensure that there is a stable solution for a wide range of error rates, different sets of controller parameters can be used for different ranges of error rate, as discussed in connection with FIG. 5. For example, a different set of preloaded controller parameters can be used for every two orders of error rate magnitude, e.g., a first set of parameters for a first error rate range of 1×10^−1 to 1×10^−2, a second set of parameters for a second error rate range of 1×10^−3 to 1×10^−4, and a third set of parameters for a third error rate range of 1×10^−5 to 1×10^−6.

Moreover, since the controller options can be implemented in the digital domain, and only one set of parameters is enabled at a time, the overhead of the proposed ERLL is negligible relative to the overall power savings.

Figure 13:
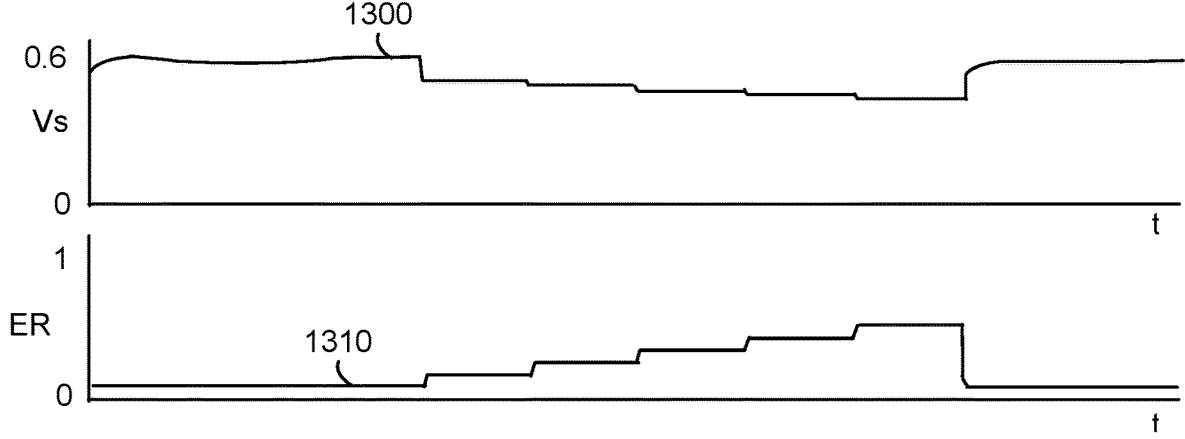
FIG. 13 depicts a plot 1300 of supply voltage versus time for the neural network processor 210, demonstrating a locking behavior with a relatively small range of error rate adjustment, and a plot 1310 of a corresponding error rate versus time, in accordance with various embodiments.
Figure 14:
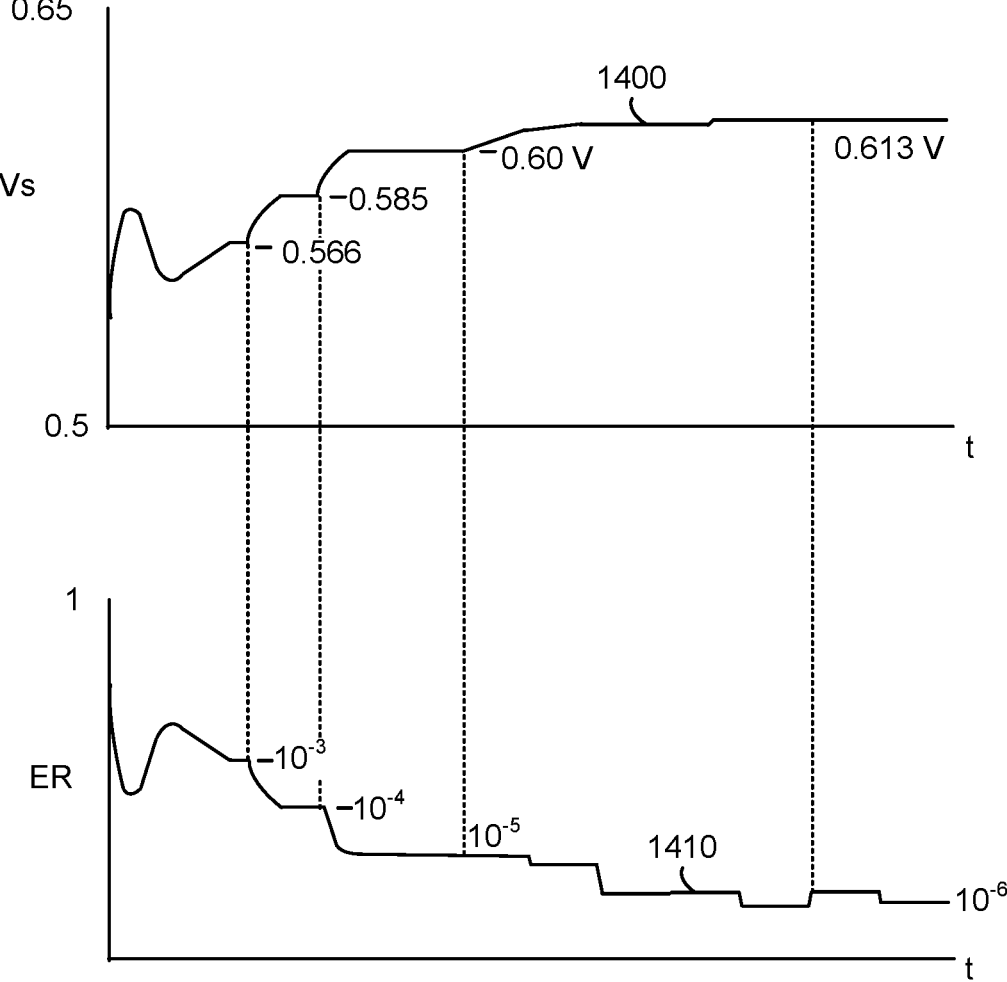
FIG. 14 depicts a plot 1400 of supply voltage versus time for the neural network processor 210, demonstrating a locking behavior with a relatively large range of error rate adjustment, and a plot 1410 of a corresponding error rate, in accordance with various embodiments.

The proposed ERLL has been tested under different situations, as depicted in FIGS. 13 and 14 below.

FIG. 13 depicts a plot 1300 of supply voltage versus time for the neural network processor 210, demonstrating a locking behavior with a relatively small range of error rate adjustment, and a plot 1310 of a corresponding error rate versus time, in accordance with various embodiments. As the error rate increases in successive steps, the supply voltage, Vs, decreases in corresponding successive steps. When the error rate steps back down, Vs steps up. In this example, the control loop is forced to lock to different targeted error rate in a relatively large range. The loop successfully reached and stabilized in a lock state for error rates of 1×10^−3, 1×10^−4, 1×10^−5 and 1×10^−6, one after another, by switching among different controller parameters. The loop needs some settling time when changing the options.

FIG. 14 depicts a plot 1400 of supply voltage versus time for the neural network processor 210, demonstrating a locking behavior with a relatively large range of error rate adjustment, and a plot 1410 of a corresponding error rate, in accordance with various embodiments. The error rate is on a logarithmic scale. The targeted error rate changes in jumps as in the example of FIG. 13, but without the need of switching the controller parameters. The settling time is much shorter than in FIG. 13 as well. Vs reaches different milestones which correspond to the different error rates. For example, Vs=0.566, 0.585, 0.60 and 0.613 V when ER=1× 10^−3, 1×10^−4, 1×10^−5 and 1×10^−6, respectively.

Figure 15:
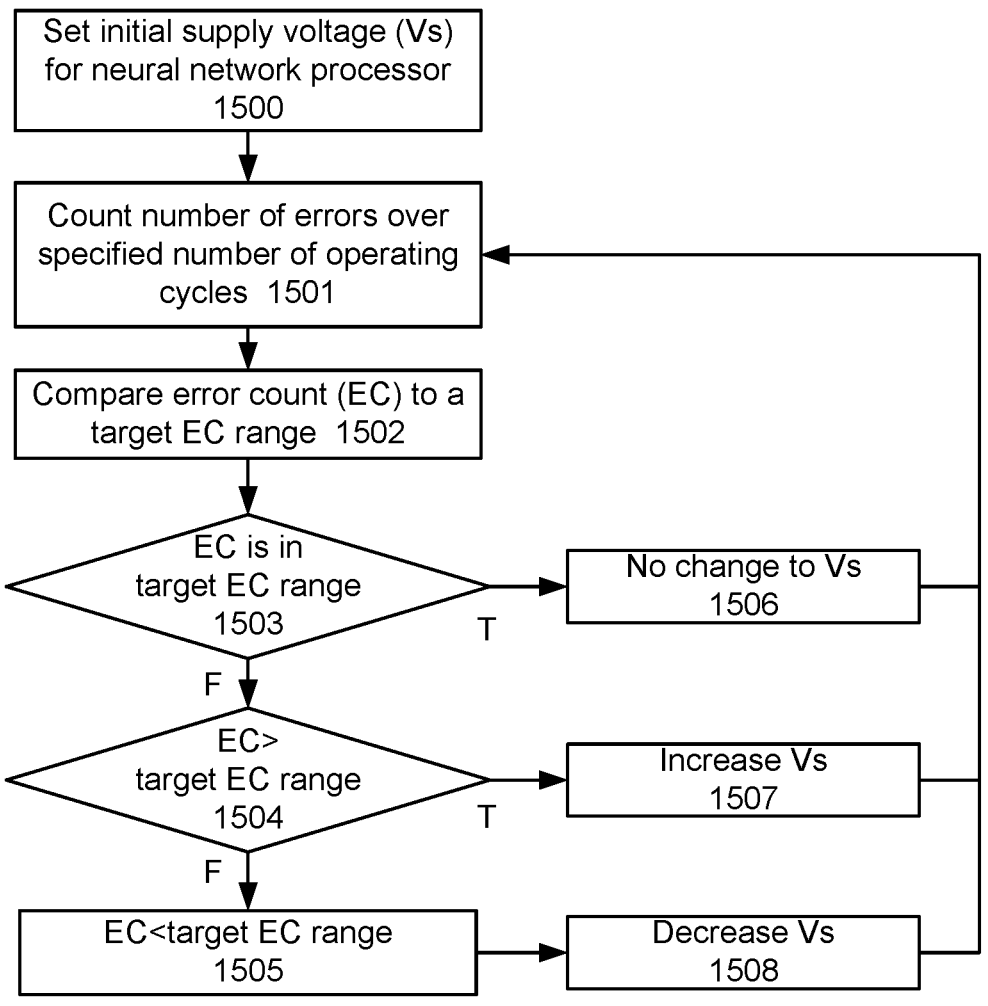
FIG. 15 depicts a flowchart of an example process for controlling a supply voltage of the neural network processor 210 of FIG. 2, in accordance with various embodiments.

FIG. 15 depicts a flowchart of an example process for controlling a supply voltage of the neural network processor 210 of FIG. 2, in accordance with various embodiments. Step 1500 includes setting an initial supply voltage (Vs) for a neural network processor. The initial level can be a level at which the neural network processor is expected to operate at steady state. Step 1501 includes counting a number of errors over a specified number of operating cycles. This can be done at the error counter 214 or 512, for example. Step 1502 includes comparing the error count (EC) to a target EC range. A decision step 1503 determines whether EC is in the target EC range. If the decision step 1503 is true (T), step 1506 indicates there is no change needed to Vs. Step 1501 follows to count the number of errors over the next specified number of operating cycles.

If the decision step 1503 is false (F), a decision step 1504 determines whether EC>target EC range. If the decision step 1504 is true, step 1507 includes increasing Vs and step 1501 follows. If the decision step 1504 is false, step 1505 indicates EC<target EC range, step 1508 includes decreasing Vs and step 1501 follows.

The adjustments to Vs in steps 1507 and 1508 can be performed in different ways, as discussed next.

Figure 16A:
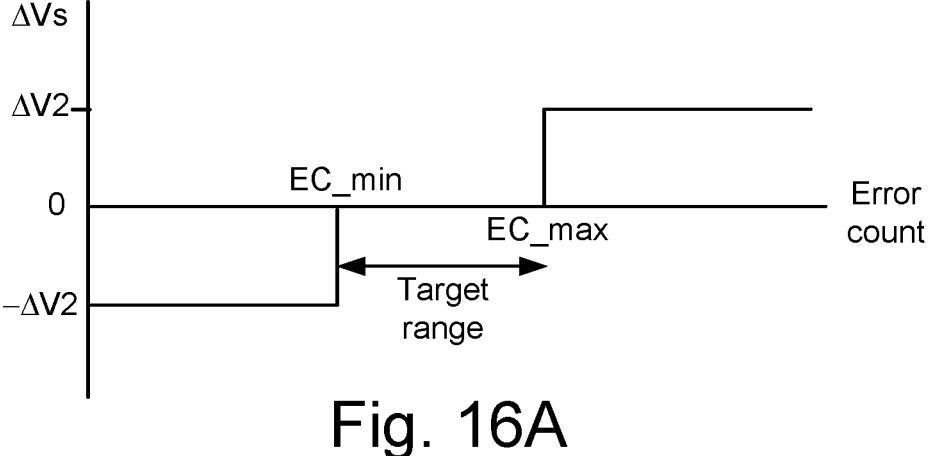
FIG. 16A depicts an example plot of AVs versus error count for use by the controller 201 or 504, in accordance with various embodiments.

FIG. 16A depicts an example plot of ΔVs versus error count for use by the controller 201 or 504, in accordance with various embodiments. ΔVs is an adjustment to the supply voltage such as in steps 1507 and 1508 of FIG. 15. In this example, the error count can fall into one of three ranges. A first range is where EC is within a target range of EC_min to EC_max. In this range, there is no adjustment to Vs. A second range is where EC<EC_min. In this range, there is an adjustment (decrease) of −ΔV2. A third range is where EC>EC_max. In this range, there is an adjustment (increase) of ΔV2. The decrease and increase are equal in magnitude in this example but could be different.

Figure 16B:
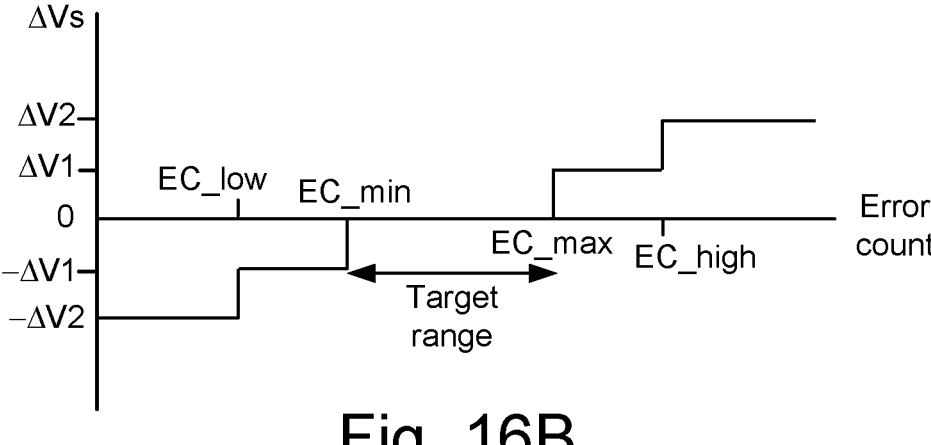
FIG. 16B depicts another example plot of AVs versus error count for use by the controller 201 or 504, in accordance with various embodiments.

FIG. 16B depicts another example plot of ΔVs versus error count for use by the controller 201 or 504, in accordance with various embodiments. In this example, the error count can fall into one of five ranges. A first range is where EC is within the target range of EC_min to EC_max. In this range, there is no adjustment to Vs. A second range is where EC_low≤EC≤EC_min. In this range, there is a relatively small adjustment (decrease) of −ΔV1. A third range is where EC<EC_low. In this range, there is a relatively large adjustment (decrease) of −ΔV2. A fourth range is where EC_max<EC≤EC_high. In this range, there is a relatively small adjustment (increase) of ΔV1. A fifth range is where EC>EC_high. In this range, there is a relatively large adjustment (increase) of ΔV2. The smaller adjustments (+/−V1) are equal in magnitude in this example but could be different. Similarly, the larger adjustments (+/−V2) are equal in magnitude in this example but could be different.

Other variations are possible as well. For example, there can be more, finer steps for increasing Vs than for decreasing it. Or, there can be more, finer steps for decreasing Vs than for increasing it.

In an example implementation, a controller is to adjust the supply voltage as a function of the difference between the error count and a target, where a magnitude of an adjustment of the voltage is greater when a magnitude of the difference is greater.

Figure 17:
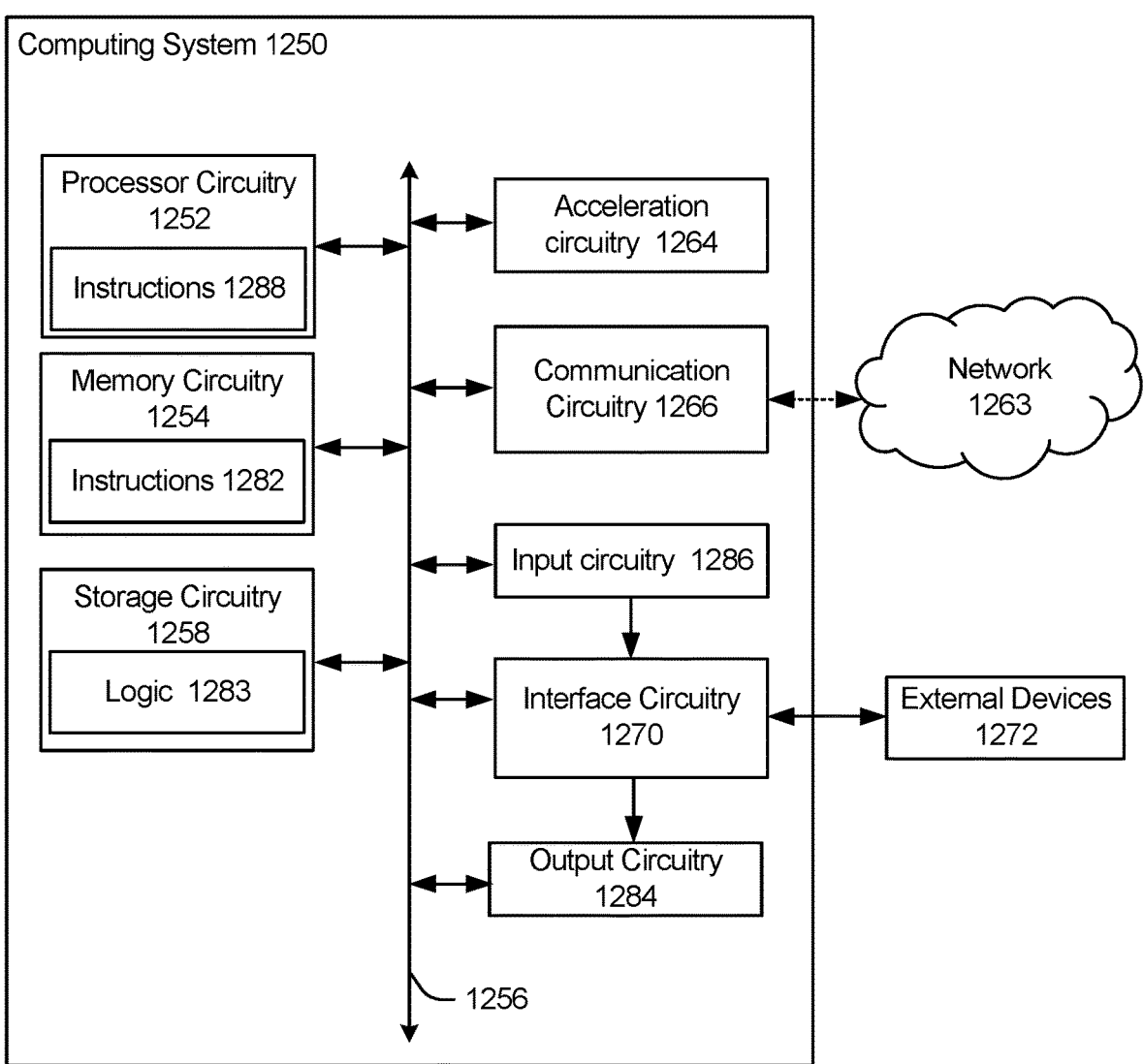
FIG. 17 illustrates an example of components that may be present in a computing system 1750 for implementing the techniques (e.g., operations, processes, methods, and methodologies) described herein.

FIG. 17 illustrates an example of components that may be present in a computing system 1750 for implementing the techniques (e.g., operations, processes, methods, and methodologies) described herein.

The computing system 1750 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 1750, or as components otherwise incorporated within a chassis of a larger system. For one embodiment, at least one processor 1752 may be packaged together with computational logic 1782 and configured to practice aspects of various example embodiments described herein to form a System in Package (SiP) or a System on Chip (SoC).

The system 1750 includes processor circuitry in the form of one or more processors 1752. The processor circuitry 1752 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1752 may include one or more hardware accelerators (e.g., same or similar to acceleration circuitry 1764), which may be microprocessors, programmable processing devices (e.g., FPGA, ASIC, etc.), or the like. The one or more accelerators may include, for example, computer vision and/or deep learning accelerators. In some implementations, the processor circuitry 1752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1752 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1752 may be coupled with or may include memory/storage and may be configured to execute instructions stored in the memory/storage to enable various applications or operating systems to run on the platform 1750. The processors (or cores) 1752 is configured to operate application software to provide a specific service to a user of the platform 1750. In some embodiments, the processor(s) 1752 may be a special-purpose processor(s)/controller(s) configured (or configurable) to operate according to the various embodiments herein.

As examples, the processor(s) 1752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MXGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1752 may be a part of a system on a chip (SoC), System-in-Package (SiP), a multi-chip package (MCP), and/or the like, in which the processor(s) 1752 and other components are formed into a single integrated circuit, or a single package, such as the Edison™ or Galileo™ SoC boards from Intel® Corporation. Other examples of the processor(s) 1752 are mentioned elsewhere in the present disclosure.

The system 1750 may include or be coupled to acceleration circuitry 1764, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 1764 may comprise logic blocks or logic fabric and other interconnected resources that may be programmed (configured) to perform various functions, such as the procedures, methods, functions, etc. of the various embodiments discussed herein. In such implementations, the acceleration circuitry 1764 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 1752 and/or acceleration circuitry 1764 may include hardware elements specifically tailored for machine learning and/or artificial intelligence (AI) functionality. In these implementations, the processor circuitry 1752 and/or acceleration circuitry 1764 may be, or may include, an AI engine chip that can run many different kinds of AI instruction sets once loaded with the appropriate weightings and training code. Additionally or alternatively, the processor circuitry 1752 and/or acceleration circuitry 1764 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1752 and/or acceleration circuitry 1764 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 1750 may be operated by the respective AI accelerating co-processor(s), AI GPUs, TPUs, or hardware accelerators (e.g., FPGAS, ASICs, DSPs, SoCs, etc.), etc., that are configured with appropriate logic blocks, bit stream(s), etc. to perform their respective functions.

The system 1750 also includes system memory 1754. Any number of memory devices may be used to provide for a given amount of system memory. As examples, the memory 1754 may be, or include, volatile memory such as random access memory (RAM), static RAM (SRAM), dynamic RAM (DRAM), synchronous DRAM (SDRAM), RAM-BUS® Dynamic Random Access Memory (RDRAM®), and/or any other desired type of volatile memory device. Additionally or alternatively, the memory 1754 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 1754 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 1758 provides persistent storage of information such as data, applications, operating systems and so forth. In an example, the storage 1758 may be implemented via a solid-state disk drive (SSDD) and/or high-speed electrically erasable memory (commonly referred to as "flash memory"). Other devices that may be used for the storage 1758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 1754 and/or storage circuitry 1758 may also incorporate three-dimensional (3D) cross-point (XPOINT) memories from Intel® and Micron®.

The memory circuitry 1754 and/or storage circuitry 1758 is/are configured to store computational logic 1783 in the form of software, firmware, microcode, or hardware-level instructions to implement the techniques described herein. The computational logic 1783 may be employed to store working copies and/or permanent copies of programming instructions, or data to create the programming instructions, for the operation of various components of system 1750 (e.g., drivers, libraries, application programming interfaces (APIs), etc.), an operating system of system 1750, one or more applications, and/or for carrying out the embodiments discussed herein. The computational logic 1783 may be stored or loaded into memory circuitry 1754 as instructions 1782, or data to create the instructions 1782, which are then accessed for execution by the processor circuitry 1752 to carry out the functions described herein. The processor circuitry 1752 and/or the acceleration circuitry 1764 accesses the memory circuitry 1754 and/or the storage circuitry 1758 over the interconnect (IX) 1756. The instructions 1782 direct the processor circuitry 1752 to perform a specific sequence or flow of actions, for example, as described with respect to flowchart(s) and block diagram(s) of operations and functionality depicted previously. The various elements may be implemented by assembler instructions supported by processor circuitry 1752 or high-level languages that may be compiled into instructions 1788, or data to create the instructions 1788, to be executed by the processor circuitry 1752. The permanent copy of the programming instructions may be placed into persistent storage devices of storage circuitry 1758 in the factory or in the field through, for example, a distribution medium (not shown), through a communication interface (e.g., from a distribution server (not shown)), over-the-air (OTA), or any combination thereof.

The IX 1756 couples the processor 1752 to communication circuitry 1766 for communications with other devices, such as a remote server (not shown) and the like. The communication circuitry 1766 is a hardware element, or collection of hardware elements, used to communicate over one or more networks 1763 and/or with other devices. In one example, communication circuitry 1766 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 1766 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 1756 also couples the processor 1752 to interface circuitry 1770 that is used to connect system 1750 with one or more external devices 1772. The external devices 1772 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 1750, which are referred to as input circuitry 1786 and output circuitry 1784 in FIG. 17. The input circuitry 1786 and output circuitry 1784 include one or more user interfaces designed to enable user interaction with the platform 1750 and/or peripheral component interfaces designed to enable peripheral component interaction with the platform 1750. Input circuitry 1786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1784 may be included to show information or otherwise convey information, such as sensor readings, actuator position(s), or other like information. Data and/or graphics may be displayed on one or more user interface components of the output circuitry 1784. Output circuitry 1784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1750. The output circuitry 1784 may also include speakers and/or other audio emitting devices, printer(s), and/or the like. Additionally or alternatively, sensor(s) may be used as the input circuitry 1784 (e.g., an image capture device, motion capture device, or the like) and one or more actuators may be used as the output device circuitry 1784 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 1750 may communicate over the IX 1756. The IX 1756 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1756 may be a proprietary bus, for example, used in a SoC based system.

The number, capability, and/or capacity of the elements of system 1750 may vary, depending on whether computing system 1750 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 1750 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: a neural network processor, the neural network processor is to output error data; a voltage regulator coupled to the neural network processor, the voltage regulator is to supply a voltage to the neural network processor; and a controller coupled to the voltage regulator, the controller is to adjust the voltage based on the error data.

Example 2 includes the apparatus of Example 1, further comprising: an error counter coupled to the neural network processor, the error counter is to provide an error count based on receipt of the error data over successive operating cycles of the neural network processor; and an adder to determine a difference between the error count from the error counter and a target, wherein the controller is responsive to the difference to adjust the voltage.

Example 3 includes the apparatus of Example 2, wherein the controller is to decrease the voltage when the difference indicates the error count from the error counter is below the target.

Example 4 includes the apparatus of Example 2 or 3, wherein the controller is to increase the voltage when the difference indicates the error count from the error counter is greater than the target.

Example 5 includes the apparatus of Examples 2-4, wherein the controller is to adjust the voltage as a function of the difference; and a magnitude of an adjustment of the voltage is greater when a magnitude of the difference is greater.

Example 6 includes the apparatus of Examples 2-5, wherein the apparatus is an edge device in an artificial intelligence network.

Example 7 includes the apparatus of Examples 2-6, wherein the error count from the error counter is a moving average over multiple operating cycles of the neural network processor.

Example 8 includes the apparatus of Examples 1-7, wherein the neural network processor is to implement a neural network comprising a plurality of monitored processing units and a respective error detection circuit for each monitored processing unit; the respective error detection circuits are to provide respective error data of the monitored processing units; and the error data which is output by the neural network processor is based on the respective error data provided by the respective error detection circuits.

Example 9 includes the apparatus of Example 8, wherein: the neural network comprises a respective activation function for each monitored processing unit; and each monitored processing unit provides an output to the respective activation function.

Example 10 includes the apparatus of Example 8 or 9, wherein the monitored processing units are arranged in different layers of the neural network and comprise fewer than all processing units of the neural network.

Example 11 includes the apparatus of Example 8-10, wherein: each monitored processing unit and respective error detection circuit receive one or more common N-bit units of data; each monitored processing unit is to process the one or more common N-bit units of data to provide a respective output; and for each monitored processing unit, the respective error detection circuit is to process M most significant bits of the one or more common N-bit units of data to provide a respective output, and to compare the respective output of the respective error detection circuit to a portion of the respective output of the monitored processing unit to provide the respective error data, where M<N.

Example 12 includes the apparatus of Example 11, wherein: each monitored processing unit comprises a respective multiply-accumulate unit to process the one or more common N-bit units of data; and each respective error detection circuit comprises a respective multiply-accumulate unit to process the M most significant bits of the one or more common N-bit units of data.

Example 13 includes the apparatus of Example 11 or 12, wherein: the respective error data of each respective error detection circuit comprises an error flag to indicate whether there is a mismatch between the respective output of the respective error detection circuit and the portion of the respective output of the monitored processing unit.

Example 14 includes the apparatus of Examples 11-13, wherein: the respective error data of the respective error detection circuits is weighted differently for different respective error detection circuits.

Example 15 includes an apparatus, comprising: an error counter coupled to a neural network processor, the error counter is to provide an error count indicating a number of errors over successive operating cycles of the neural network processor; an adder to determine a difference between the error count from the error counter and a target error count; and a controller to implement a control loop to adjust a voltage supplied to the neural network processor based on the difference, wherein the controller is to set one or more gain parameters as a function of the target error count.

Example 16 includes the apparatus of Example 15, wherein: the target error count is adjustable.

Example 17 includes the apparatus of Example 15 or 16, wherein the one or more gain parameters comprise at least one of a gain parameter for a proportional path of the controller or a gain parameter for an integral path of the controller.

Example 18 includes the apparatus of Examples 15-17, wherein the controller is to set the one or more gain parameters to maintain a phase margin of the control loop of at least 45 degrees.

Example 19 includes an apparatus, comprising: a memory device to store instructions; a processor to execute the instructions to implement a neural network comprising a plurality of processing units, wherein a subset of the processing units are monitored processing units, the neural network further comprising a respective error detection circuit for each monitored processing unit, the respective error detection circuits are to provide respective error data of the monitored processing units; and an error summation circuit to receive the respective error data from the respective error detection circuits and to output a corresponding sum of errors.

Example 20 includes the apparatus of Example 19, wherein: each monitored processing unit and respective error detection circuit receive one or more common N-bit units of data; each monitored processing unit is to process the one or more common N-bit units of data to provide a respective output; and for each monitored processing unit, the respective error detection circuit is to process M most significant bits of the one or more common N-bit units of data to provide a respective output, and to compare the respective output of the respective error detection circuit to a portion of the respective output of the monitored processing unit to provide the respective error data, where M<N.

Example 21 includes the apparatus of Example 20, wherein: each monitored processing unit comprises an N-bit multiply-accumulate unit; and each respective error detection circuit comprises an M-bit multiply-accumulate unit.

Example 22 includes the apparatus of Example 20 or 21, wherein: the respective error data of each respective error detection circuit comprises an error flag to indicate whether there is a mismatch between the respective output of the respective error detection circuit and the respective output of the monitored processing unit.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:

a neural network processor including at least one monitored processing unit with an associated error detection circuit, the monitored processing unit to process received data and to generate a processed result, the associated error detection circuit to process at least a portion of the received data to generate a test result that is to be compared with a corresponding part of the processing result to generate error data;

a voltage regulator coupled to the neural network processor, the voltage regulator is to supply a voltage to the neural network processor; and a controller coupled to the voltage regulator, the controller is to adjust the voltage based on the error data.

2. The apparatus of claim 1, further comprising:

an error counter coupled to the neural network processor, the error counter is to provide an error count based on receipt of the error data over successive operating cycles of the neural network processor; and an adder to determine a difference between the error count from the error counter and a target, wherein the controller is responsive to the difference to adjust the voltage.

3. The apparatus of claim 2, wherein:

the controller is to decrease the voltage when the difference indicates the error count from the error counter is below the target.

4. The apparatus of claim 2, wherein:

the controller is to increase the voltage when the difference indicates the error count from the error counter is greater than the target.

5. The apparatus of claim 2, wherein:

the controller is to adjust the voltage as a function of the difference; and a magnitude of an adjustment of the voltage is greater when a magnitude of the difference is greater.

6. The apparatus of claim 2, wherein the apparatus is an edge device in an artificial intelligence network.

7. The apparatus of claim 2, wherein:

the error count from the error counter is a moving average over multiple operating cycles of the neural network processor.

8. The apparatus of claim 1, wherein:

the neural network processor is to implement a neural network comprising a plurality of the at least one monitored processing units and a respective error detection circuit for each monitored processing unit;

the respective error detection circuits are to provide respective error data of the monitored processing units; and the error data which is output by the neural network processor is based on the respective error data provided by the respective error detection circuits.

9. The apparatus of claim 8, wherein:

the neural network comprises a respective activation function for each monitored processing unit; and each monitored processing unit provides an output to the respective activation function.

10. The apparatus of claim 8, wherein:

the monitored processing units are arranged in different layers of the neural network and comprise fewer than all processing units of the neural network.

11. The apparatus of claim 8, wherein:

each monitored processing unit and respective error detection circuit receive one or more common N-bit units of data;

each monitored processing unit is to process the one or more common N-bit units of data to provide a respective output; and for each monitored processing unit, the respective error detection circuit is to process M most significant bits of the one or more common N-bit units of data to provide a respective output, and to compare the respective output of the respective error detection circuit to a portion of the respective output of the monitored processing unit to provide the respective error data, where M<N.

12. The apparatus of claim 11, wherein:

each monitored processing unit comprises a respective multiply-accumulate unit to process the one or more common N-bit units of data; and each respective error detection circuit comprises a respective multiply-accumulate unit to process the M most significant bits of the one or more common N-bit units of data.

13. The apparatus of claim 11, wherein:

the respective error data of each respective error detection circuit comprises an error flag to indicate whether there is a mismatch between the respective output of the respective error detection circuit and the portion of the respective output of the monitored processing unit.

14. The apparatus of claim 11, wherein:

the respective error data of the respective error detection circuits is weighted differently for different respective error detection circuits.

* * * * *